US010427347B2

(12) United States Patent
Strange et al.

(10) Patent No.: US 10,427,347 B2
(45) Date of Patent: *Oct. 1, 2019

(54) RAM EXTRUDING THIN PANELS OF UHMW POLYMERS

(71) Applicant: Rochling Engineering Plastics, Orangeville (CA)

(72) Inventors: Broderick Jason Strange, Mono (CA); Daniel Patrick Braniff, Orangeville (CA)

(*) Notice: Subject to any disclaimer, the term of this patent is extended or adjusted under 35 U.S.C. 154(b) by 884 days.

This patent is subject to a terminal disclaimer.

(21) Appl. No.: 15/047,935

(22) Filed: Feb. 19, 2016

(65) Prior Publication Data

US 2017/0239868 A1  Aug. 24, 2017

(51) Int. Cl.
*B29C 47/10* (2006.01)
*B29C 47/90* (2006.01)
*B29C 48/285* (2019.01)
*B29C 48/86* (2019.01)
(Continued)

(52) U.S. Cl.
CPC ............ *B29C 48/288* (2019.02); *B29C 48/07* (2019.02); *B29C 48/297* (2019.02); *B29C 48/30* (2019.02); *B29C 48/305* (2019.02); *B29C 48/475* (2019.02); *B29C 48/865* (2019.02); *B29C 48/904* (2019.02); *B29C 48/9135* (2019.02); *B29C 48/92* (2019.02); *B29C 2948/92704* (2019.02); *B29C 2948/92904* (2019.02);
(Continued)

(58) Field of Classification Search
CPC ............ B29C 47/0019; B29C 47/1027; B29C 47/1081; B29C 47/14; B29C 47/54; B29C 47/80; B29C 47/82; B29C 47/884; B29C 47/904; B29C 47/92; B29C 48/07; B29C 48/288; B29C 48/297; B29C 48/30; B29C 48/305; B29C 48/475; B29C 48/865; B29C 48/872; B29C 48/873; B29C 48/875; B29C 48/904; B29C 48/9135; B29C 48/92; B29C 2948/92704; B29C 2948/92904; B29C 2948/92923
See application file for complete search history.

(56) References Cited

U.S. PATENT DOCUMENTS 2,317,331 A * 4/1943 Mearig ................... B30B 11/26
264/109
2,485,523 A * 10/1949 Ashbaugh ............... B29C 45/53
264/176.1
(Continued)

*Primary Examiner* — Joseph S Del Sole
*Assistant Examiner* — Joseph S Leyson
(74) *Attorney, Agent, or Firm* — Cohen & Grigsby, P.C.

(57) ABSTRACT

A ram extrusion apparatus including a die having several thermal zones, a hopper for introducing a granular polymer resin to the die, and a ram for moving the granular polymer resin through the thermal zones of the die and out from an outlet end thereof at a temperature above the crystalline melt temperature of the polymer resin. The hopper may be designed to deliver the polymer resin into a resin inlet of the die in a plurality of specifically metered amounts which may vary across a width of the resin inlet end of the die. The apparatus may further include one or more finishing tables positioned after the outlet end of the die for receiving and moving the extruded resin away from the outlet end of the die so that there is no backpressure on the extruded resin, and which provide compression force and even cooling to the extruded resin.

22 Claims, 7 Drawing Sheets

(51) Int. Cl.
*B29C 48/30* (2019.01)
*B29C 48/92* (2019.01)
*B29C 48/07* (2019.01)
*B29C 48/305* (2019.01)
*B29C 48/475* (2019.01)
*B29C 48/88* (2019.01)
*B29C 48/90* (2019.01)
*B29K 23/00* (2006.01)
*B29L 7/00* (2006.01)

(52) U.S. Cl.
CPC ............ *B29C 2948/92923* (2019.02); *B29K 2023/0683* (2013.01); *B29L 2007/002* (2013.01)

(56) References Cited

U.S. PATENT DOCUMENTS

| | | | |
|---|---|---|---|
| 3,492,310 A | 1/1970 | Carrow | |
| 3,883,631 A | 5/1975 | Murray | |
| 3,887,319 A | 6/1975 | Cottingham | |
| 4,128,369 A | 12/1978 | Kemerer et al. | |
| 4,145,175 A | 3/1979 | Groff et al. | |
| 4,361,530 A * | 11/1982 | Peer | B27N 3/28 264/109 |
| 4,874,657 A | 10/1989 | Lo et al. | |
| 5,155,146 A * | 10/1992 | Reetz | B27N 3/00 521/47 |
| 5,413,745 A * | 5/1995 | Andersson | B29B 17/0042 264/119 |
| 6,193,919 B1 * | 2/2001 | Ford | B29B 17/0042 264/211.12 |
| 7,803,450 B2 | 5/2010 | Gregg et al. | |
| 7,736,579 B2 | 6/2010 | Gregg et al. | |
| 7,758,796 B2 | 7/2010 | Gregg et al. | |
| 7,758,797 B2 | 7/2010 | Gregg et al. | |
| 7,980,839 B2 | 7/2011 | Gregg et al. | |
| 7,981,349 B2 | 7/2011 | Gregg et al. | |
| 2008/0018026 A1 * | 1/2008 | Gregg | B29C 43/22 264/519 |

* cited by examiner

RAM EXTRUDING THIN PANELS OF UHMW POLYMERS

FIELD OF THE INVENTION

This invention pertains generally to ram extrusion machinery, and more particularly to an apparatus capable of continuous, rapid extrusion of wide thin panels of ultra-high molecular weight polymers.

BACKGROUND OF THE INVENTION

Large plastic panels can be produced by a number of techniques, including compression molding, ram extrusion, and sintering. Ram extrusion of granular polymer resins typically uses equipment comprising a ram and die arrangement. The polymer material to be extruded is introduced into an inlet end of a die and forward strokes of a reciprocating ram compact the material and force it through the heated die in a continuous manner to form an uninterrupted shape of a desired profile.

Many types of plastic materials such as polyvinyl chloride plastic and ABS plastic have been successfully extruded in this manner. However, this seemingly simple procedure has proven quite difficult in practice when employing ultra-high molecular weight (UHMW) polymer resins. Such resins are sensitive to shear forces, particularly when extrusion pressures are very high (approaching 50,000 psi), which is complicated by the fact that they tend to exert significant frictional forces on a die during the extrusion process. Further, these resins are sensitive to high temperatures, often showing degradation due to oxidation at temperatures above 260° C., so that dwell time within the die becomes important. Lowered temperatures that may permit longer dwell times, however, are not economical and often do not fully melt the resin.

Early attempts to extrude UHMW polymer resins often resulted in defects such as undesirable interior voids, cracks, or noticeable separations between various charges impelled by repeated strokes of the ram. Sometimes they even included regions which still exhibited the original powdery or granular structure of the material, having evidently been insufficiently softened in the die.

Recent advances in ram extrusion processes have provided for production of larger panels of material, but generally these panels are several inches thick and have limited widths. Unless the heating protocols used to produce these panels are tightly controlled, the extrusion can be misshapen, or the final dimensions may not be held within acceptable tolerances. Further, if air gains access to the compacted resin, and/or the temperature is increased too much, an oxidation process can start which lowers the molecular weight of the polymers and reduces the physical properties of the final product.

The production of wider thinner panels has also been limited by the ram extrusion apparatus. To produce a large flat panel of UHMW polymer resin, a die having a large top and bottom surface is employed. Such a die may experience increased internal pressures which are difficult to control, especially for panels having a thinner profile. In general, the large pressures cause the center region of these wider dies to bow, thus producing a panel having a greater thickness in the middle than the edges, which is more evident for thinner panels. Prior art attempts to solve this problem have used dies which are concavely bowed toward the center, to counter the large outward forces generated during the extrusion process.

Further, upon exit from the heated die, if the panels are not cooled evenly and at a uniform rate, the crystallinity of the extrudate becomes heterogeneous to such an extent that the resulting solid panel is not flat, stress free or possessing the homogeneous physical properties required for satisfactory end use of the UHMW polymer product. That is, the large surface area and high aspect ratio of such panels often causes them to distort upon cooling below the crystalline melt temperature external to the die. Differences in the rate of cooling and crystallization can cause warping, bowing, thickness and surface irregularities, and the like. Such defects would then require minimally, shaving of the surface and machining to size. However, some defects, for example warp and bow, may be impossible to remove.

Accordingly, there exists a need in the art for improved systems and methods for extrusion of UHMW polymer resins, and particularly, for extrusion of large aspect ratio panels of UHMW polymer resin.

SUMMARY OF THE INVENTION

The presently disclosed invention overcomes many of the shortcomings of the prior art by providing systems and methods for ram extrusion of wide thin panels of UHMW polymer resin. Disclosed are systems and methods for delivering differential amounts of a granular UHMW polymer resin across a width of a die inlet on a ram extrusion apparatus. Further disclosed are systems and methods to compress and evenly cool the UHMW polymer resin panels after exit from a die of a ram extrusion apparatus.

Thus, according to its major aspects, and briefly stated, the present invention includes an apparatus for extruding a polymer resin comprising a die having an inlet end, an outlet end and a plurality of thermal zones spaced along a width and a length of the die, a ram mounted for movement within the inlet end of the die from a retracted position to an extended position, and at least one hopper for holding and delivering a granular polymer resin to a resin inlet of the die. Further included are means for independently regulating a temperature of the plurality of thermal zones to temperatures above or below the crystalline melt temperature of the polymer resin, and means for imparting movement of the ram along a longitudinal axis of the die to move the polymer resin from the resin inlet through the plurality of thermal zones and out from the outlet end of the die, the polymer resin being melted and compressed to form an extrusion profile of the die during progression through the thermal zones of the die.

According to certain aspects of the apparatus, the die may comprises a top portion, a bottom portion, and side portions which define the extrusion profile of the die, the extrusion profile having a thickness of not more than 0.75 inches, such as not more than 0.5 inches, and a width of greater than 40 inches, such as 54 inches, or even 66 inches. Further, the thermal zones near the inlet end of the die, such as near the resin inlet and ram, may remain unheated, or may be cooled to a temperature below the crystalline melt temperature of the polymer resin. The thermal zones throughout a remaining portion of the die may be heated to a temperature at or above the crystalline melt temperature of the polymer resin. More than one thermal zone may be included, such that a temperature gradient or curve may be maintained across a length and/or width of the die profile.

According to certain aspects of the apparatus, a thermal break may be incorporated between the inlet end of the die, and the heated regions of the die, or heated thermal zones. That is, a thermal break may be incorporated in each of an upper and lower die plate of the die in advance of the resin inlet, wherein the thermal break defines at least a heated thermal region comprising the thermal zones spaced between the thermal break and the outlet end of the die. In general, the polymer resin is extruded from the outlet end of the die at a temperature that is at or above the crystalline melt temperature of the polymer resin. In certain instances, the region between the resin inlet or inlet end of the die and the thermal break may be cooled to maintain the temperature to below the crystalline melt temperature of the polymer resin.

According to certain aspects of the apparatus, the at least one hopper of the apparatus may be configured to deliver the polymer resin in a granular state into the resin inlet of the die in a plurality of specifically metered amounts which may vary across a width of the resin inlet end of the die. Generally, the resin inlet is proximate the inlet end of the die and in advance of the retracted position of the ram.

Various methods and apparatus are envisioned which achieve delivery of varied amounts of the polymer resin across the width of the resin inlet. According to certain aspects, the at least one hopper may comprise a plurality of feed tubes spaced along the width of the resin inlet of the die, each of the plurality of feed tubes comprising a distal end which is proximal to the resin inlet of the die and a proximal end in fluid communication with the at least one hopper. Each of the plurality of feed tubes may comprise an auger feeder, a vibratory feeder, or a rotary feeder which is independently controllable to deliver the plurality of specifically metered amounts of polymer resin. Alternatively, or additionally, each of the plurality of feed tubes may be independently moveable in a direction perpendicular to the longitudinal axis of the die, and/or parallel to the longitudinal axis of the die, to deliver the plurality of specifically metered amounts of polymer resin.

According to certain aspects of the apparatus, each of the plurality of feed tubes may comprise a shoe at the distal end thereof configured to evenly distribute the polymer resin from each of the plurality of feed tubes to the resin inlet of the die. The plurality of feed tubes may be evenly spaced along the width of the resin inlet of the die to provide a contiguous supply of the polymer resin along the width of the resin inlet of the die.

According to certain aspects of the apparatus, the extruded polymer resin ("extrudate"), which exits from the outlet end of the die at a temperature that is at or above the crystalline melt temperature of the polymer resin, may be evenly cooled and/or vertically compressed after exit from the outlet end of the die. Such may assist in providing a constant and even crystallization rate for the polymer resin, such as an UHMW polymer resin, so that the structural characteristics of the polymer resin (e.g., strength), and of the panel (e.g., no warp or bow, even thickness), may be tightly controlled.

Various methods and apparatus are envisioned which achieve vertical compression and even cooling of the extrudate after exit from the die. Further, such mean may provide movement of the extrudate away from the outlet end of the die so that no horizontal compression is exerted on the extrudate. That is, any means for moving the extrudate away from the outlet end of the die does not apply a compression force on the extrudate parallel to a longitudinal axis (with the direction of flow of the polymer resin through the ram extrusion apparatus), but may apply a compression force on the extrudate perpendicular to the longitudinal axis.

According to certain aspects of the invention, the apparatus may further comprise one or more finishing tables which move the extrudate away from the outlet end of the die so that there is no backpressure on the extrudate, and which promote even cooling and intermittent compression to the extrudate. Each of the one or more finishing tables may comprise top and bottom plates, wherein the top plate is moveable in a direction perpendicular to the longitudinal axis of the die through a range of positions which include at least (a) an open position which does not contact the extrudate, (b) a down position which does contact the extrudate but does not apply a compression force on the extrudate, and (c) a clamped position which contacts and applies the compression force on the extrudate.

The one or more finishing tables may include means for controlling a temperature of the top and bottoms plates to below the crystalline melt temperature of the polymer resin. Such means may directly or indirectly, such as through fans, control the temperature of the plates. Further, the top and bottom plates of each of the one or more finishing tables may comprise an embossed or debossed pattern. When more than one finishing table is included, a temperature of the top and bottom plates of a second or subsequent finishing table may be lower than a temperature of the top and bottom plates of a first or prior finishing table.

According to certain aspects of the apparatus, a first finishing table may be positioned after the outlet end of the die and may be moveable in a direction parallel to the longitudinal axis of the die. When included, a second finishing table may be positioned after the first finishing table and moveable in a direction parallel to the longitudinal axis of the die. The second finishing table may be configured to (A) move away from the first finishing table when the top plate of the second finishing table is in the down or clamped position and the top plate of the first finishing table is in any position, and move toward the first finishing table when the top plate of the second finishing table is not in the clamped position and the top plate of the first finishing table is in the down or clamped position; (B) move in unison with the first finishing table; or (C) remain in a static position, wherein when the top plate of the first finishing table is in any position, the top plate of the second finishing table is in the down position to provide even temperature dissipation (i.e., cooling) to the extrudate but no compression force on the extrudate.

The present invention also includes a method for producing polymer panels using a ram extruder. The method comprises introducing specifically metered amounts of a granular polymer resin across a width of an inlet end of a die of the ram extruder, the die having a profile defined by a thickness of less than 0.75 inches, such as 0.5 inches, and a width of greater than 40 inches, such as 54 inches or even 66 inches; incrementally pushing the granular polymer resin toward an outlet end of the die under pressure from a ram; heating the granular polymer resin to a temperature at or above the crystalline melt temperature as the granular polymer resin progresses through the die toward the outlet end, wherein the granular polymer resin is melted and compressed to conform to the profile of the die; and extruding the melted polymer resin as an extrudate from the outlet end of the die at a temperature above the crystalline melt temperature. According to certain aspects of the method, the inlet end of the die may be cooled to a temperature below a crystalline melt temperature of the granular polymer resin.

According to certain aspects of the method, the specifically metered amounts of the granular polymer resin may comprise a plurality of specifically metered amounts which may vary across a width of a resin inlet of the die. Generally, the resin inlet is proximate the inlet end of the die and in advance of the retracted position of the ram. Various methods and apparatus are envisioned which achieve delivery of the varied amounts of the polymer resin across the width of the resin inlet. The granular resin may be supplied from at least one hopper having a plurality of feed tubes that are individually controllable and moveable in directions substantially perpendicular to, and/or substantially parallel to, the direction of movement of the ram. For example, more resin may be delivered from feed tubes near the edges of the die profile than from feed tubes at the middle of the die.

According to certain aspects of the method, the extrudate may exit the outlet end of the die and pass to at least a first finishing table which may move the extrudate away from the outlet end of the die so that there is no backpressure on the extrudate. The first finishing table may comprise upper and lower plates which intermittently apply a compression force on the extrudate and evenly distribute heat from the extrudate.

According to certain aspects of the method, the extrudate may be pulled or pushed from the first finishing table onto a second finishing table comprising upper and lower plates which intermittently apply a compression force on the extrudate and evenly distribute heat from the extrudate.

The present invention also includes UHMW polymer resin panels having a thickness of less than 0.75 inches, such as 0.5 inches, and a width of greater than 40 inches, such as 54 inches or even 66 inches, which are produced using any of the apparatus or methods disclosed herein. In particular, the present invention includes UHMW polyethylene or polytetrafluoroethylene panels having a thickness of between 0.50 to 0.55 inches, and a width of between 40 to 66 inches.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale.

DETAILED DESCRIPTION

Figure 1A:
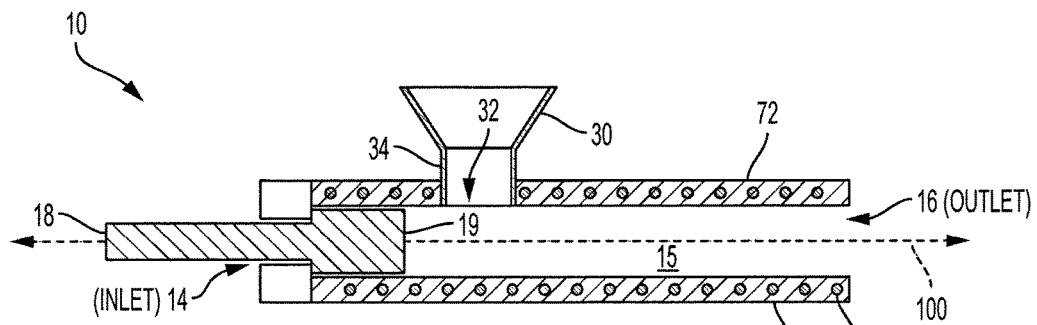
FIG. 1A illustrates a cross-sectional view along a longitudinal axis of a die comprising a ram in a retracted position in accordance with certain aspects of the present invention.

In the following description, the present invention is set forth in the context of various alternative embodiments and implementations involving systems and methods for producing wide thin panels of ultra-high molecular weight (UHMW) polymers which have a large aspect ratio defined by a thickness of equal to or less than 0.75 inches, such as 0.5 inches, and a width of at least 40 inches, such as 54 inches or even 66 inches. Disclosed are unique ram extrusion apparatuses and methods that optimize delivery of a granular polymer resin at an inlet end of a die, and provide even cooling and compressive forces on the extrudate after exit from an outlet end of the die, to produce panels having a consistent thickness and excellent performance characteristics more economically and in larger volume than has heretofore been possible.

Various aspects of the ram extrusion apparatus may be illustrated with reference to one or more exemplary implementations. As used herein, the term "exemplary" means "serving as an example, instance, or illustration," and should not necessarily be construed as preferred or advantageous over other variations of the devices, systems, or methods disclosed herein. In addition, the word "comprising" as used herein means "including, but not limited to".

Various aspects of the ram extrusion apparatus may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" may be used herein to describe one element's relationship to another element illustrated in the drawings. It will be understood that relative terms are intended to encompass different orientations of aspects of the ram extrusion apparatus in addition to the orientation depicted in the drawings. By way of example, if aspects of the ram extrusion apparatus shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. Thus, for example, reference to "a hopper", "a finishing table", or "a feed tube" is a reference to one or more of each and equivalents thereof known to those skilled in the art, and so forth. Unless defined otherwise, all technical and scientific terms used herein have the same meanings as commonly understood by one of ordinary skill in the art.

It is a major object of the present invention to provide a novel method and apparatus for the continuous extrusion of UHMW polymer resins as panels having a thickness of equal to or less than 0.75 inches and a width of greater than 40 inches. The length of the extruded panels may vary, and may be determined on an as needed basis, such as defined by a specific final product configuration, storage location, or shipping method.

Referring now to the drawings, embodiments of the ram extrusion apparatus of the present invention are shown in FIGS. 1-7. FIGS. 1A-1D illustrate cross-sectional views of a die 10 and reciprocating ram 18. As shown in FIG. 1A, the die 10 comprises an upper plate 72 and a lower plate 74 which define a die opening 15 having an inlet end 14 and an outlet end 16. A reciprocating ram 18 may be positioned near the inlet end 14 of the die 10, in advance of a resin inlet 32 of a hopper 30 which is positioned proximate the inlet end 14 of the die 10. The ram 18 may have a rectangular shaped ram head 19 which may reciprocate along a longitudinal axis 100 coincident with the die opening 15. Charges of a granular polymer resin may be delivered from the hopper 30 to the resin inlet 32 in advance of the retracted ram 18. According to certain aspects of the invention, the hopper 30 may also comprise a feed tube 34 or chute which connects a lower end of the hopper 30 to the resin inlet 32.

Figure 1B:
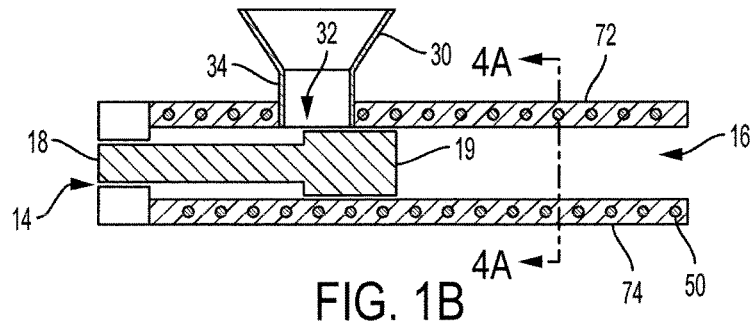
FIG. 1B illustrates a cross-sectional view of the die shown in FIG. 1A, with the ram in an extended position.

As shown in FIG. 1B, the ram 18 may reciprocate to an extended position within the die opening to compact the charge of granular polymer resin, and advance the compacted charge through a series of thermal zones 50 in the die 10, where it may exit from an outlet end 16 of the die 10. The various thermal zones 50 in the die 10 may be cooled or heated. For example, the thermal zones 50 to the left of the resin inlet 32 (i.e., toward the inlet end 14 of the die) may be cooled to keep the granular resin from melting and/or oxidizing prior to compaction and extraction of excess air, while those to the right of the resin inlet 32 (i.e., toward the outlet end 16 of the die) may be heated. Further, the thermal zones 50 to the right of the resin inlet 32 may be differentially heated such that a gradient or curve of dissimilar heats are applied to the polymer resin as it progresses through the die opening toward the die outlet 16. The temperature of the thermal zones 50 at or near the die outlet 16 may be at or above the crystalline melt temperature of the polymer resin.

Figure 1C:
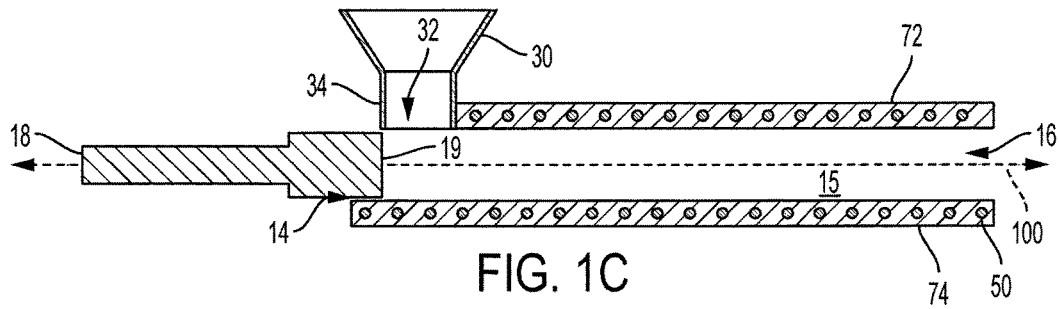
FIG. 1C illustrates a cross-sectional view along a longitudinal axis of a die comprising a ram in a retracted position in accordance with certain aspects of the present invention.
Figure 1D:
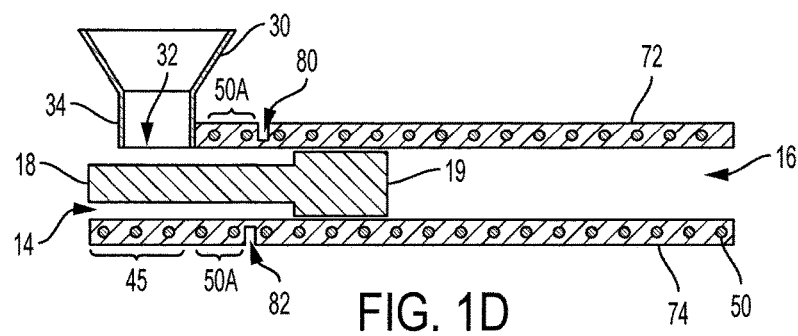
FIG. 1D illustrates a cross-sectional view of the die shown in FIG. 1C, with the ram in an extended position.

Shown in FIGS. 1C and 1D is an alternative arrangement for the hopper 30 and resin inlet 32. FIG. 1C shows the upper plate 72 and lower plate 74 which define the die opening 15 having an inlet end 14 and an outlet end 16, wherein the hopper 30 and resin inlet 32 are positioned very near to or at the inlet end 14 of the die. A reciprocating ram 18 may be positioned in advance of the resin inlet 32. FIG. 1D shows the ram 18 and ram head 19 in an extended position, having reciprocated along a longitudinal axis 100 coincident with the die opening 15. Charges of a granular polymer resin delivered from the hopper 30 to the resin inlet 32 in advance of the retracted ram 18 are now pushed into the die opening and through the die toward the outlet end 16 of the die.

Also shown in FIG. 1D is a thermal break (80, 82) in each of the upper and lower plates (72, 74) of the die. The thermal break (80, 82) generally separates the thermal zones 50 of the die so that regions of cooling and regions of heating remain separate. For example, as shown in FIG. 1D, the thermal break 80 in the upper plate 72 may comprise a portion of the upper plate 72 that has been removed so that the region is exposed to ambient air. Similarly, the thermal break 82 in the lower plate 74 may comprise a portion of the lower plate 74 that has been removed so that the region is exposed to ambient air. Alternately, the thermal break may comprise a portion of the upper and/or lower plates (72, 74) that has been replaced with a different material, such as a non-conducting material or high-temperature composite that may isolate the various thermal regions. Further, the thermal break may simply comprise one or more of the thermal zones 50 that are held at a constant neutral temperature such as, for example, ambient.

Figure 2A:
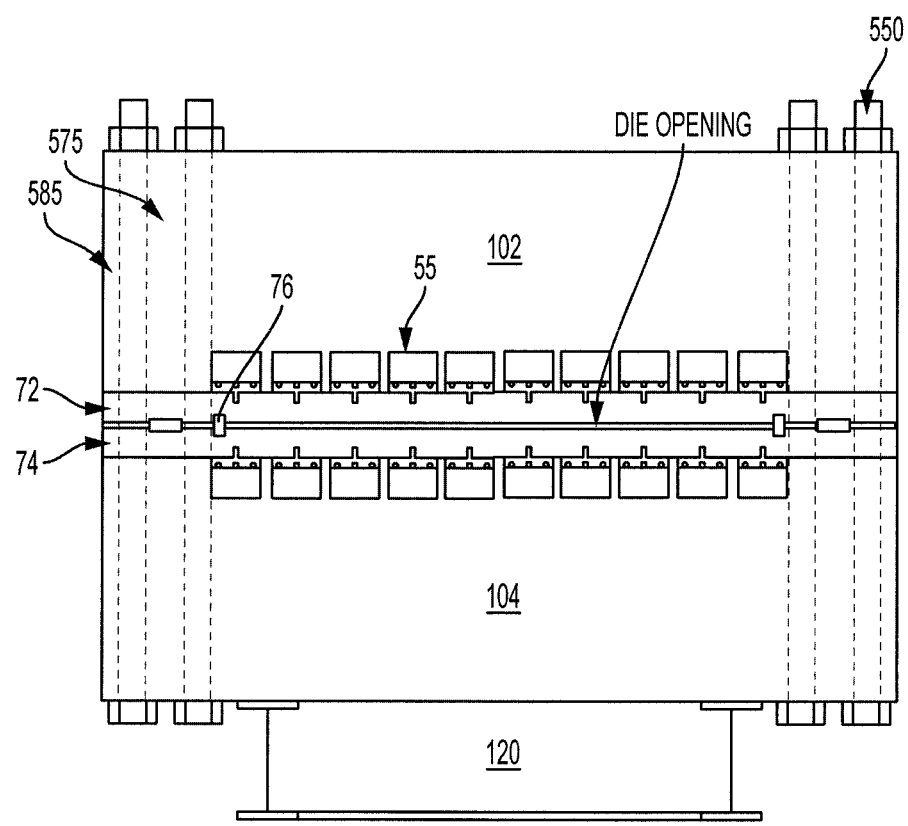
FIG. 2A illustrates a cross-sectional view of a ram extrusion apparatus showing the die plates and pressure blocks in accordance with certain aspects of the present invention.

As shown in FIG. 2A, the die plates (72, 74) of the ram extrusion apparatus may be sandwiched between upper 102 and lower 104 pressure blocks. These pressure blocks (102, 104) may help to hold the die plates (72, 74) in a constant position independent of the internal pressure exerted in the die opening (i.e., resist the outward forces that may cause bowing of the plates in the middle which may produce a panel that is thicker in the middle). For the production of panels that are not very wide, such as less than 24 inches wide, and/or generally thicker than the present invention, such as about 2 inches thick or more, the pressure blocks (102, 104) may provide enough resistance to counter the internal pressures that cause bowing of the die plates (72, 74). However, as will be discussed below, even very large pressure blocks (102, 104) may not provide enough resistance to such internal pressure during production of the wide thin sheets of the present invention.

Also shown in FIG. 2A are the tensioning studs 550 that may be used to hold the die plates (72, 74) and pressure blocks (102, 104) in position relative to one another, and a support base 120. While a set of two rows of tensioning studs 550 are shown on either side of the die opening, any number of rows of tensioning studs 550 may be included, such as a single row on each side of the die opening. Further, any number of tensioning studs 550 may be included in each row such as, for example, 2 to 8 tensioning studs 550. The position of each row of tensioning studs may also be varied so that the space between rows (575) and at the edge of the pressure blocks (585) may be varied. Such variations, i.e. number and positions of tensioning studs, may depend on the length, width, and thickness of the die opening.

As indicated above with reference to FIGS. 1A-1D, the die comprises various thermal zones 50 that may be cooled, such as near the inlet end 14 of the die, or heated, such as the region after the resin inlet 32 toward the outlet end 16 of the die. Various means to cool or heat these various thermal zones 50 are possible. For example, as shown in FIG. 2A, slots 55 may be machined into the upper and lower pressure blocks (102, 104). These slots 55 may be sized to hold cartridge heaters or chillers that may be used to provide heating or cooling to the thermal zones of the die. The cartridge heaters or chillers may make contact with, or may be partially inserted into, a face of the die plates (72, 74 of FIG. 1D), which is opposite the die opening. These slots 55 may be spaced across the width of the die opening and may be filled with cartridge heaters or chillers which may be independently controlled to provide a thermal gradient or curve across the width of the opening, or may be linked in groups or all together to provide a constant temperature across all or a portion of the width of the die.

As indicted in FIG. 1A, the thermal zones may also span the length of the die opening (along the longitudinal axis 100, see FIG. 1A). As such, the slots 55 may be filled with cartridge heaters or chillers that may span the length of the die opening, and may be independently controlled to provide a thermal gradient or curve along the length of the opening, or may be linked in groups or all together to provide a constant temperature along all or a portion of the length of the die. In general, cooling by any means is only employed near the inlet end of the die, such as near the resin inlet 32, and heating by any means is employed throughout the rest of the die, such as throughout the region after the resin inlet 32 and up to, and including, the outlet end 16 of the die.

Figure 2B:
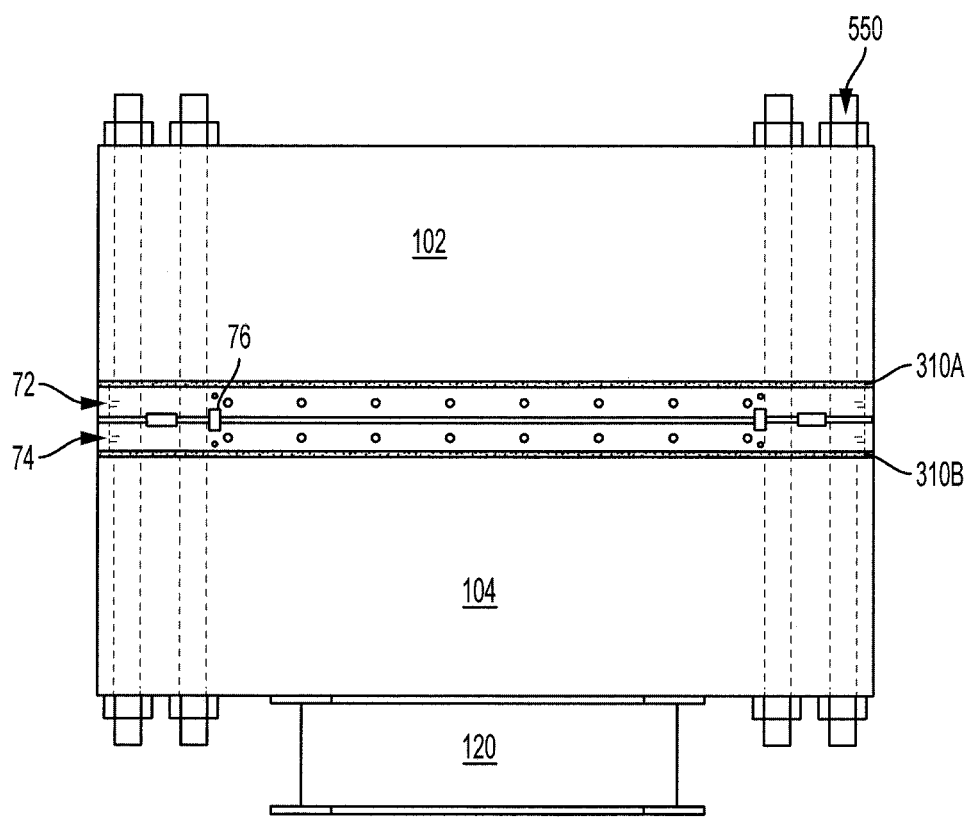
FIG. 2B illustrates a cross-sectional view of a ram extrusion apparatus showing the die plates and pressure blocks in accordance with certain aspects of the present invention.

Thus, according to certain aspects of the invention, the thermal zones 50 ahead of or in proximity to the resin inlet 32, or before a thermal break (80, 82 of FIG. 1D), may be cooled, such as by water or coolant lines through the upper and lower plates (72, 74 of FIG. 1D), or by cartridge chillers or water coolers fitted into machined slots 55 in the pressure blocks (see 102, 104 in FIG. 2A), or by cartridge chillers or water coolers fitted into machined slots in the upper and lower die plates (see 72, 74 in FIG. 2B). Such cooling is generally done to keep the die opening and ram from heating so that the polymer resin does not melt and/or oxidize on entry to the die opening and before de-aeration and compression of the resin can occur. Thus, the cooling is generally to a temperature below the crystalline melt temperature of the polymer resin.

Further, the thermal zones 50 after the resin inlet 32, or after the thermal break (80, 82 of FIG. 1D), may be heated to temperatures at or above the crystalline melt temperature of the polymer resin. Heating may be through conduits in the upper and lower plates (72, 74 of FIG. 1D), or by cartridge heaters or the like fitted into machined slots 55 in the pressure blocks (see 102, 104 in FIG. 2A), or by cartridge heaters or the like fitted into machined slots in the upper and lower die plates (see 72, 74 in FIG. 2B). Such heating may be done in a gradient along the longitudinal axis (100 of FIG. 1A) of the die opening, such as in two or more thermal zones, and may vary across the width of the die opening, such as heating near the edges of the die opening that is different than the heating in the middle of the die opening. These heated thermal zones are generally employed to heat the die and melt the polymer resin so that it forms into the shape of the die. The polymer panel generally exits from the die as an extrudate which is at or above the crystalline melt temperature of the polymer resin.

Figure 3:
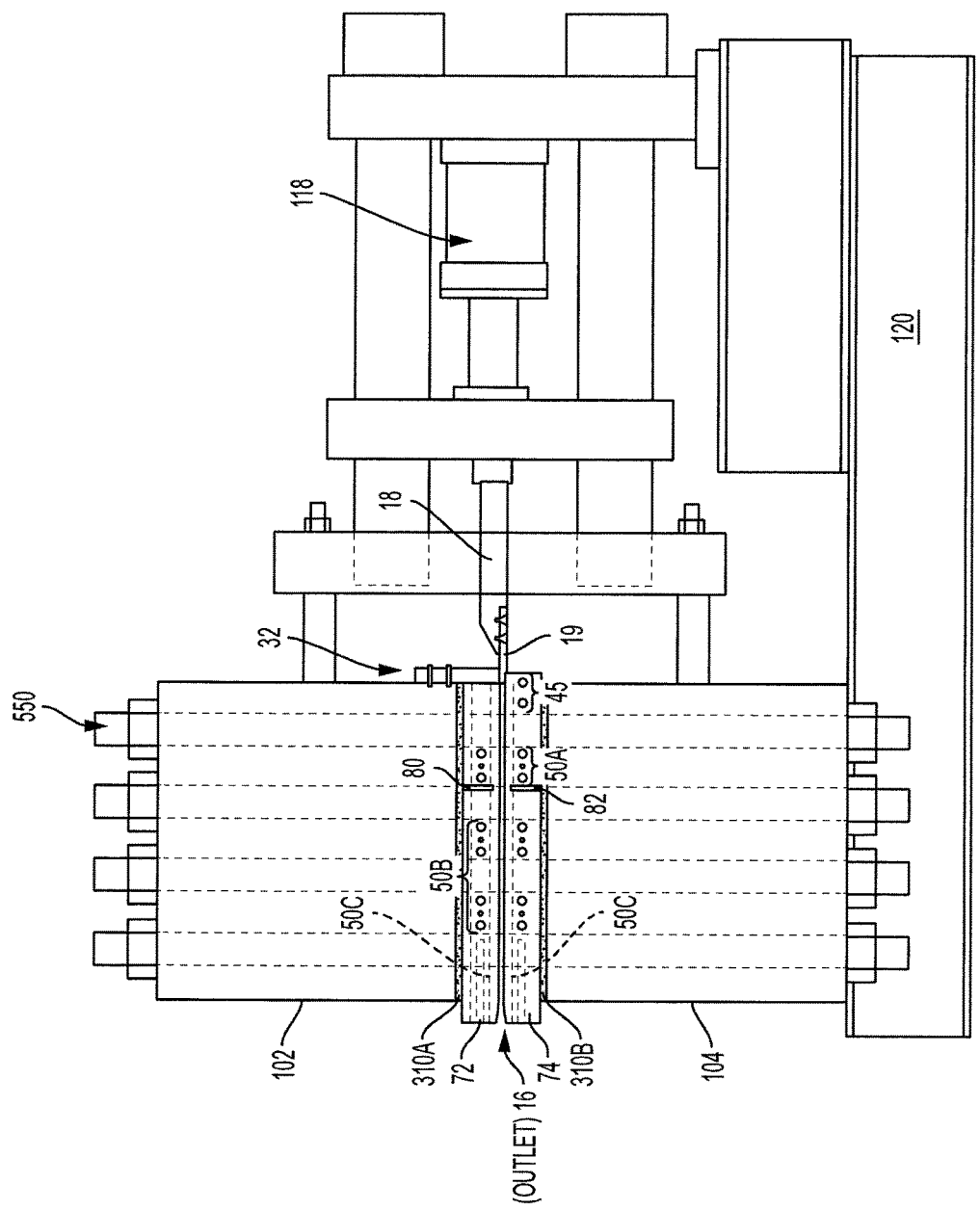
FIG. 3 illustrates a side view of a ram extrusion apparatus showing the relative positions of the die plates and pressure blocks, and a ram and hydraulic cylinders in accordance with certain aspects of the present invention.

Further, various means to heat or cool the thermal zones are possible and within the scope of the present invention. As shown in FIGS. 1A-1D, 4A, 4B, and 5, thermal zones may be conduits in the die plates (72, 74) that span the width of the die opening. Alternately, and as shown in FIG. 2A, the thermal zones may include slots machined into the upper and lower pressure blocks (102, 104) which make contact with the upper and lower die plates (72, 74) on a face opposite from the die opening. Small ports may also be machined into the upper and lower die plates (72, 74), as shown in FIG. 2A, which may receive a small portion of the cartridge heaters or chillers. Alternately, and as shown in FIGS. 2B and 3, the thermal zones may include slots machined into the upper and lower die plates (72, 74) on a face opposite from the die opening. In any of the described arrangements, various means and devices such as, for example cartridge heaters, chillers, fluid lines, and combinations thereof, which may provide heating and/or cooling to the die plates (72, 74) and/or die opening 15 are envisioned and within the scope of the present invention.

It will be understood that the temperatures of the various thermal zones of the die are set to heat the polymer resin to a temperature at or above the crystalline melt temperature of the polymer resin, or to cool the polymer resin to a temperature below the crystalline melt temperature of the polymer resin. As such, the temperature profile of the die may depend on the specific polymer resin chosen for extrusion. It also must be understood that the temperatures referred to hereinabove, unless noted otherwise, are die temperatures as distinguished from material temperatures and that these die temperatures will have direct relationship to, and depend upon, the cross section of the profile being extruded.

For example, a cooled thermal region near the inlet end, or prior to a thermal break, may be any temperature below the crystalline melt temperature of the polymer resin. A heated thermal region after the resin inlet, or after a thermal break, may include several thermal zones which heat the die plates to a temperature at or above the crystalline melt temperature such as, for example, about 300° F. to about 420° F. Care may be exercised to ensure that the temperatures of the various thermal zones not exceed the degradation point of the polymer resin, which is generally in excess of 500° F. for most UHMW polymer resins.

An exemplary number of thermal zones and range of temperatures in each thermal zone is as follows for an UHMW polyethylene resin (UHMW-PE), which has a crystalline melt temperature of between 266° F.-277° F.:

Three thermal zones along the longitudinal axis of the die opening, which include
  (a) before the thermal break, below 260° F., generally below 200° F.
  (b) after the thermal break, 300° F. to 320° F.
  (c) middle region, 330° F. to 420° F.
  (d) exit region, 300° F. to 350° F.

Furthermore, toward the exit region, the temperature near the edges of the die (near the side portions 76, see FIG. 5) may be higher than the middle region (i.e., in the center of the die) to prevent the polymer resin from sticking during an interruption or start-up and to prevent the extrudate from hanging back at the edges of the panel due to frictional forces.

Figure 5:
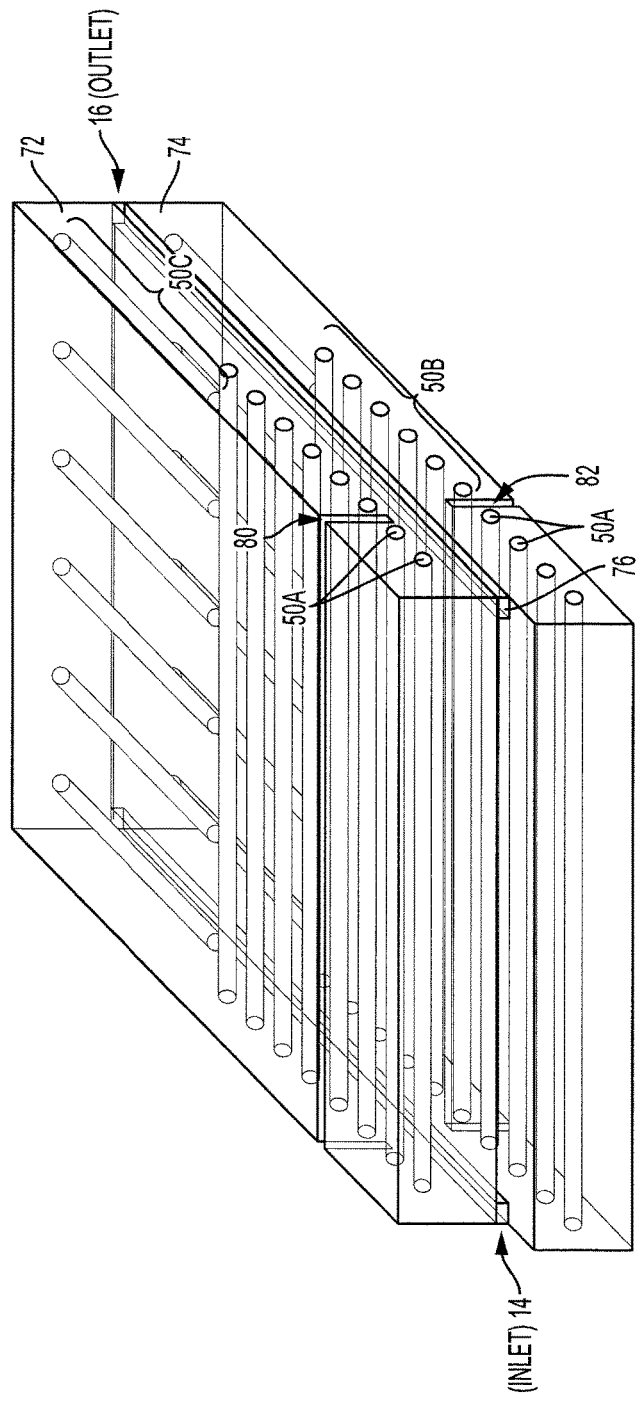
FIG. 5 illustrates a transparent view of a die showing internal thermal zones in accordance with certain aspects of the present invention.

For example, and with reference to FIGS. 3 and 5, thermal zone (a) may comprise water lines 45, and conduits or ports (50A), thermal zones (b) and (c) may comprise conduits or ports (50B), while thermal zone (d) may comprise conduits or ports (50C). Since the conduits or ports (50C) run parallel to the longitudinal axis of the die opening (see 100 of FIG. 1A), heating may be varied across the width of the die opening near the outlet end 16.

The granular polymer resin employed herein may comprise an ultra-high molecular weight (UHMW) polymer resin such as polyethylene, polytetrafluoroethylene, polyamidoimide, polyamide (nylon, Kevlar), polyacetal (polyoxymethylene), polyethylene terephthalate, or polybutylene terephthalate. Preferably, the granular polymer resin may comprise an UHMW polyethylene or polytetrafluoroethylene.

Further, the UHMW polymer resin may comprise additional additives such as, for example, dyes and pigments, antioxidants, UV stabilizers, thermal stabilizers, nucleating and clarifying agents, lubricants, electrically conducting materials, fillers and other reinforcement materials, and combinations thereof. The amounts of such additives is generally small, such as up to 5 wt %, or between 0.1 wt % and 3 wt %. Exemplary lubricants include waxes and oils, such as silicone oils. Lubricants may reduce the coefficient of friction and/or add release properties, and may also increase the gloss of the final panel product. For example, 2 wt % polydimethylsiloxane oil added to an UHMW polyethylene resin produced a panel having a gloss of between 22 and 30 as measured by a 60° gloss meter.

Furthermore, in instances where the polymer resin is a non-semi crystalline polymer resin, such as for polyester or polycarbonate resins, the heating temperatures may be to temperatures above the melt temperature of the resin, and the cooling temperatures may be to temperatures below the melt temperature of the resin. As such, while certain semi-crystalline resins and temperatures have been discussed, a range of other resins may be formed into panels using the apparatus and methods described herein. Such other resins may include at least non-semi crystalline resins such as polyesters or polycarbonates, or semi-crystalline resins such as polyolefins, or highly crystalline resins such as polyketones. In certain cases, resins which may melt and flow in the absence of additives may still find use in the apparatus and methods described herein when they are supplemented with fillers or are highly crosslinked.

The combination of temperature from the various thermal zones of the die and the pressure exerted on the polymer resin by action of the ram may combine to soften and melt the polymer resin so that it may become a homogeneous mass having putty-like characteristics, wherein a complete bond is created between the successive charges of polymer particles. This mass of polymer resin may be compressed within the die opening to conform to the profile of the die opening (i.e., generally rectangular shape).

As shown in FIG. 3, the polymer resin enters the die opening through the resin inlet 32 and is compressed and pushed along a longitudinal axis (see 100 of FIG. 1A) toward the outlet end 16 of the die by a ram 18. The ram 18 may be a plate having a rectangular ram head 19 attached to an end which is configured to reciprocate between a retracted position and an extended position, as described above. The ram 18 may be actuated by hydraulic cylinders 118, pneumatic cylinders, screw jacks, or any others means know in the art.

The ram head 19 may be smaller than the die opening (e.g., less thick and slightly less wide) to prevent rubbing and binding in the die. A wiper plate may be used to push the ram head 19 against the bottom surface of the die opening to prevent the ram 18 from lifting and to force the expelled air and fines up into the chamber opening (see resin inlet 32, feed tube 34, and hopper 30 of FIG. 1A). The back section of the ram 18 which is generally exterior to the die opening may also be cooled with water channels 45 to prevent oxidization of the polymer resin at the powder charge interface and to prevent melting before compression.

Also shown in FIG. 3 are various thermal zones which may heat or cool different regions of the die and die opening. As mentioned above, regions of the die before the thermal break (80, 82) in the upper and lower plates (72, 74) of the die (i.e., to the right of the thermal break in FIG. 3) may be cooled. For example, water channels 45 are shown in the bottom die plate 74 near the back section of the ram 18 which may be generally exterior to the die opening, and channels or machined ports are shown (50A) near the resin inlet 32, but before the thermal break (80, 82). Further, regions of the die after the thermal break (80, 82) in the upper and lower plates (72, 74) of the die (i.e., to the left of the thermal break in FIG. 3) may be heated. For example, channels or machined ports are shown which may run perpendicular to the longitudinal axis of the die (50B), and/or may run parallel to the longitudinal axis of the die (50C). The addition of channels or machined ports which run parallel to the longitudinal axis of the die (50C) may provide a range of heating schemes across the width of the die, specifically at the die exit.

The ram extrusion apparatus of the present invention may also comprise high temperature composite layers (310A, 310B) which are sandwiched between the die plates (72, 74) and the pressure blocks (102, 104). These high temperature composite layers may act as a thermal break and may help to isolate the pressure blocks from the temperatures of the die plates, and thus provide protection for the various heating/cooling components. The thermal break may also speed startup times as the thermal zones will attain operating temperatures more quickly, and may lower the cost of maintaining the operating temperatures (no power wasted on heating the pressure blocks).

Also shown in FIG. 3 are the tensioning studs 550, the slots 55 which may hold a cartridge heater or chiller, for example, and the base 120 which may support the ram extrusion apparatus.

Figure 4A:
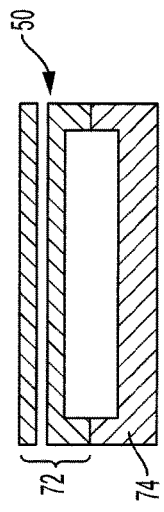
FIG. 4A illustrates a cross-sectional view of the die as shown in FIG. 1B taken along line 4A-4A.
Figure 4B:
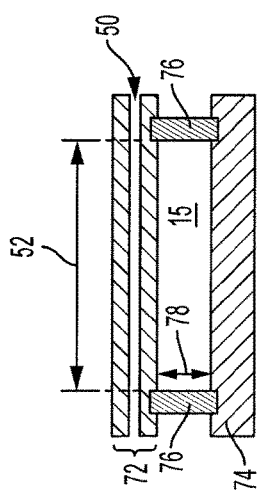
FIG. 4B illustrates a similar cross-sectional view as shown in FIG. 4A for a die in accordance with certain aspects of the present invention.

Shown in FIG. 4A is a cross-sectional view of the die opening taken along line 4A-4A of FIG. 1B. The top and bottom die plates (72, 74) are shown to be separated by side portions 76 which together define a die profile having a width 52 and thickness 78. Also shown is a thermal zone 50, which in this illustration is a depicted as a conduit. In instances where the thermal zones may be offset, only one conduit (thermal zone 50) would appear in a cross-sectional view. Alternately, and as shown in FIG. 4B, the upper and lower die plates (72, 74) may have integral side portions which define the die profile.

Shown in FIG. 5 is a transparent view of a die showing an upper die plate 72 that is separated from a lower die plate 74 by a set or spacers 76, all of which define an inner profile of the die opening. Also shown are thermal breaks (80, 82) in the upper and lower die plates, and one arrangement which may be used to achieve thermal zones (see 50 of FIG. 1A). As shown, the thermal zones may be conduits through the die plates which are perpendicular to the direction of travel of the polymer resin (45, 50A, 50B; from inlet 14 to outlet 16), or parallel to the direction of travel of the resin (50C). Thermal zones (45, 50A) before the thermal break may be cooled, while those after the thermal break may be heated (50B, 50C). The conduits may be used to pass fluids such as water or coolant. Alternately, the die plates (72, 74) may comprise rows of small ports that may receive or be in contact with a portion of the cartridge heaters or chillers. Still yet, the die plates (72, 74) may not comprise any conduits or ports, and may be heated or cooled by direct contact with the various heaters or chillers, which according to certain aspects of the invention, may be positioned in the pressure blocks (102, 104).

As indicated above, and with reference to FIG. 1A, the polymer resin may be delivered to the resin inlet 32 of the die in amounts which are constant across the width of the resin inlet, or in amounts which vary across the width of the resin inlet. Typical Ram extrusion uses a "flooded hopper", which means the entire resin inlet of the die is loaded with enough resin to completely fill the die cavity with each stroke of the ram. As such, there are no means for feeding more or less granular polymer resin to a specific area of the die without exerting a backpressure on the extrudate. Thus, control of product straightness, stress and charge lines are commonly done using friction brakes after the exit of the die. In certain prior art solutions, this backpressure is used to force the polymer resin to fully conform to the die profile. When extruding thin panels with a large aspect ratio, braking at the exit of the die will cause the soft, melted polymer resin to buckle. Furthermore this method has proven to be of limited use since the polymer resin exhibits memory that causes the shape formed during melting to be restored later or to be stored in the form of stress in the product.

Thus, a major object of the present invention is an apparatus and method which provides for the delivery of varied amounts of the polymer resin across the width of the die entry, and during the length of a production run (i.e., the varied amounts of polymer resin delivered across the width of the die opening may be changed as a function of time, and thus also along a length of the production run). Thus, according to certain aspects of the present invention, varied amounts of the polymer resin may be delivered across the width of the resin inlet of the die to maintain an adjustable distribution of the resin which may control powder charge, gauge, extrudate straightness, flatness and stress in the final panel product.

Various methods and apparatus are envisioned which may achieve this object. For example, the polymer resin may be delivered from more than one hopper 30 via feed tubes 34 having different diameters, or via feed tubes 34 which are positioned at a different height relative the bottom plate 74 of the die. Feed tubes 34 that are wider, or positioned farther from the lower die plate 74 may deliver more granulated resin to the resin inlet 32 of the die 10. Alternately, or in addition, the feed tube 34 from each hopper 30 could comprise an auger feeder, vibratory feeder, or rotary feeder which may be individually controllable so that varied amounts of the polymer resin may be delivered from each hopper 30 across the width of the resin inlet 32.

Alternately, each hopper 30 and/or feed tube 34 may comprise a series of baffles, diverters, controlled slide gates, and/or gravimetric weigh bins, for example, which may provide delivery of a plurality of varied amounts of the polymer resin across the width of the die entry. Thus, according to certain aspects of the present invention, one or more hoppers 30 may be employed to deliver the granular polymer resin.

Figure 6:
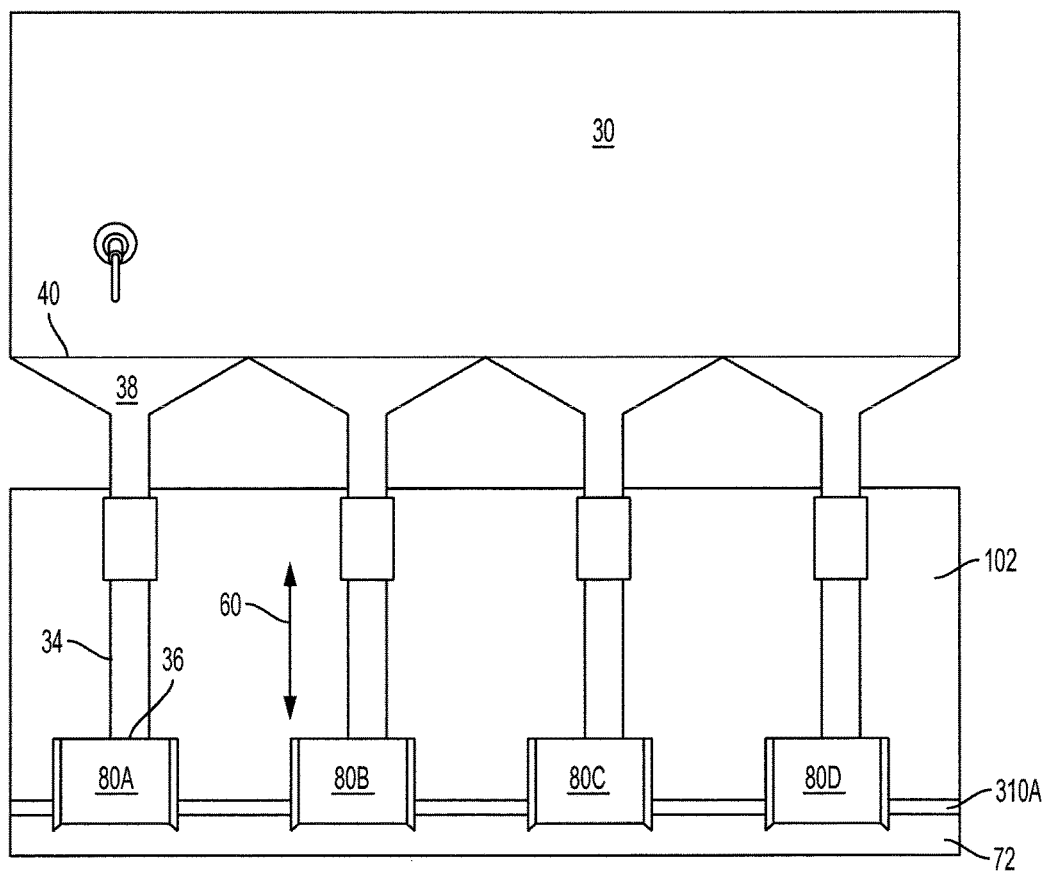
FIG. 6 illustrates an end view of a hopper and die in accordance with certain aspects of the present invention.
Figure 7:
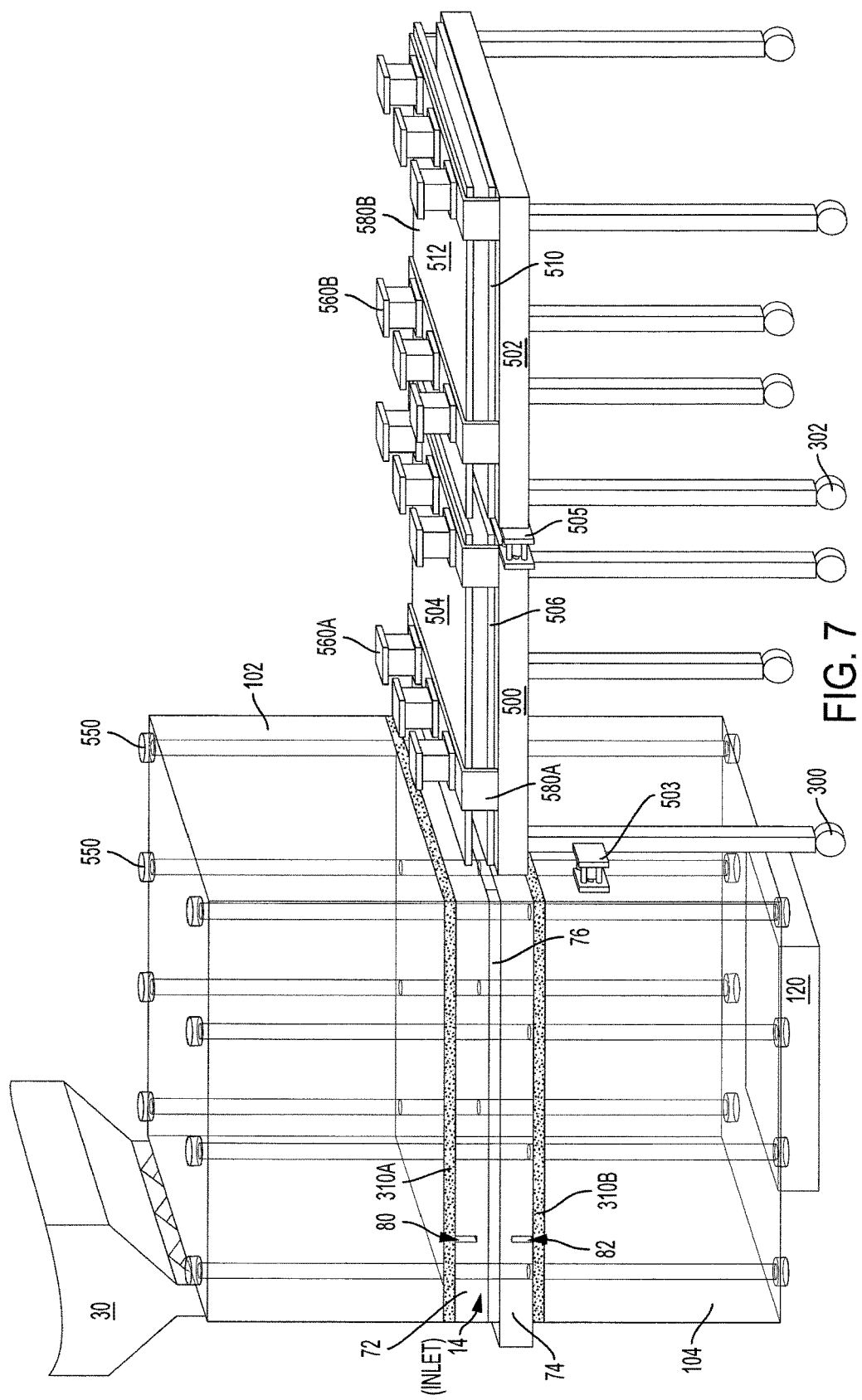
FIG. 7 illustrates a transparent view of a ram extrusion apparatus showing relative positions of a hopper, a die, and two finishing tables in accordance with certain aspects of the present invention.

Furthermore, and as shown in FIG. 6, each hopper 30 may have one or more feed tubes 34 (four are shown in FIG. 6). The feed tubes 34 may have a proximal end 38 which is attached to the hopper 30, such as along a bottom portion 40 of the hopper, and a distal end 36 which is proximal to the resin inlet 32 of the die (at or proximal to the inlet end 14 of the die opening). The upper pressure block 102 and upper die plate 72 may be machined to provide an aperture (resin inlet 32) for the powdered or granular polymer resin to enter the die opening. Recall, this opening may be at or near the inlet end 14 of the die opening (as shown in FIG. 1C), or positioned partially within the die opening (as shown in FIG. 1A).

With continued reference to FIG. 6, the feed tubes 34 may be individually moveable along an axis 60 which is perpendicular to the longitudinal axis of the die opening (see 100 in FIG. 1A), such as telescopically. Further, the feed tubes 34 may be individually moveable along an axis which is parallel to the longitudinal axis of the die opening. While four feed tubes 34 are shown in FIG. 6, any number of feed tubes 34 may be attached to any number of hoppers 30. For example, three hoppers 30 could be employed, each having 1 or 2 feed tubes 34, or one hopper 30 having 3 to 6 feed tubes 34. In this way, for example, different amounts of the granular polymer resin could be delivered to the middle of the die opening (e.g., less) than along the edges of the die opening (e.g., more).

As shown in FIG. 6, each feed tube 34 may also comprise a shoe 80A-80D attached at the distal end 36 thereof. The individual shoes 80A-80D may aid in providing an even distribution of the granular resin along the width of the resin inlet, and may provide a means to form a contiguous flow of resin from the plurality of feed tubes (i.e., uninterrupted charge of resin across the width of the resin inlet). Each shoe 80A-80D may be moveable along an axis which is perpendicular to the longitudinal axis of the die opening (60, generally with the feed tube movement), or parallel to the longitudinal axis of the die opening (e.g., tilt, wherein tilting away from the resin inlet 32 may provide a greater space into which the granulated resin may fall, thus providing more granulated resin to the resin inlet 32 of the die 10). Each of the movements of the feed tubes 34 and/or shoes 80A-80D may be individually controllable so that varied amounts of the polymer resin may be delivered from the one or more hoppers 30 across the width of the resin inlet 32. For example, the feed tubes/shoes at the outer edges (80A, 80D) may deliver a different amount than the feed tubes/shoes at the center (80B, 80C) of the die opening.

Furthermore, instead of, or in addition to the various movements of the feed tubes 34 and shoes 80A-80D, each feed tube 34 may comprise an auger feeder, vibratory feeder, or rotary feeder which may be individually controllable so that varied amounts of the polymer resin may be delivered from the one or more feed tubes 34 across the width of the resin inlet 32.

The amount of granular polymer resin delivered across the width of the resin inlet may be controlled automatically or manually such as by a machine operator observing the panels exiting the machine. The amounts from each of the hoppers 30 and/or feed tubes 34 may be controlled to correct warpage or surface imperfections as noted. For example, if the panel is thicker is a certain region, such as toward the center of the panel, less resin may be deposited from hoppers 30 and/or feed tubes 34 near the center of the resin inlet 32 of the die, or more resin may be deposited from hoppers 30 and/or feed tubes 34 near the edges of the resin inlet 32 of the die.

Such a process can be easily implemented as an automatic process in hardware and/or software, for example, by scanning the panel transversely at one or more positions along its length by means of an optical comparator or the like, or feel gauges, etc., which detect warpage, thickness, or bowing, and make corrections automatically. It should be noted that due to the nature of the problems associated with ram extrusion of high aspect ratio panels, numerous factors will cause instability, for example, fluctuations in coolant temperature, raw material batch changes, etc.

Also shown in FIG. 6 is a high temperature composite layer 310A that may be positioned between the upper pressure block 102 and the upper die plate 72. Not shown is a similar high temperature composite layer which may be positioned between the lower pressure block 104 and the lower die plate 74.

Once the polymer resin has passed through the various thermal zones and is fully compressed to conform to the profile of the die opening (i.e., generally rectangular shape), it may exit the die outlet 16 as an extrudate. The extrudate may pass from the die outlet 16 onto a cooling table where pressure may be applied along an axis perpendicular to the direction of movement of the extrudate (perpendicular to the longitudinal axis 100 of the die opening, see FIG. 1A). As previously discussed, differences in the rate of cooling and crystallization can cause warping, bowing, thickness and surface irregularities, and the like. Thus, one or more finishing tables may be provided to which allow even cooling and compression of the extrudate.

The extrudate may exit from the outlet end 16 of the die at a temperature that is at or above the crystalline melt temperature of the polymer resin. For UHMW polyethylene (UHMW-PE), the crystalline melt temperature is generally considered to be between 266° F.-277° F. As the extrudate exits through the outlet end of the die, the extrudate travels through a cooling zone, such as onto one or more finishing tables wherein the temperature is reduced gradually to a temperature below the crystalline melt temperature, such as to a temperature of between 100-130° F. At this temperature the finished product may be completely self-supporting.

As indicated above, the extrudate exits the outlet end 16 of the die at or above the crystalline melt temperature of the polymer resin, and retains sufficient heat to remain in an amorphous state for a few minutes after leaving the outlet end 16. It is the treatment of the material at this critical stage which is a further object of the present invention. The soft extrudate may warp and buckle as it exits the die unless it is vertically restrained. Also, control of the cooling rate such that the temperature gradient from the middle to the edges is minimized may help to reduce stress in the finished product.

It has been found by the present inventors that controlled cooling of the extrudate after it leaves the outlet end of the die opening leads to improved performance characteristics of the extrudate (no warping, buckling, or stress) and reduced production costs. More specifically, prior art methods involved the use of an annealing oven to reheat the extruded panels to reduce the stresses caused by uneven cooling of the UHMW polymer resins. The methods and apparatus of the present invention remove the need for an extra heating step, such as in the annealing oven.

Various methods and devices are envisioned which may achieve even cooling and compression forces on the extrudate. For example, and with reference to FIG. 7, the ram extrusion apparatus may comprise one or more finishing tables (500, 502) which move the extrudate away from the outlet end of the die so that there is no backpressure on the extrudate. Further, the one or more finishing tables may promote even cooling and provide intermittent compression to the extrudate. Each of the one or more finishing tables (500, 502) may comprise top (504, 512) and bottom (506, 510) plates, wherein the top plate is moveable in a direction perpendicular to the longitudinal axis of the die through a range of positions which include at least (a) an open position which does not contact the extrudate, (b) a down position which does contact the extrudate but does not apply a compression force on the extrudate, and (c) a clamped position which contacts and applies a compression force on the extrudate.

Further, each of the one or more finishing tables (500, 502) may include means for controlling a temperature of the top (504, 512) and bottom (506, 510) plates to below the crystalline melt temperature of the polymer resin. The upper and lower plates may be cooled or temperature controlled directly, such as through heating or cooling of the plates, or indirectly, such as through fans and the like which may be positioned external and/or not in contact with the plates.

When more than one finishing table is included, a temperature of the top and bottom plates (510, 512) of a second (or subsequent) finishing table (502) may generally be lower than a temperature of the top and bottom plates (504, 506) of a first (or prior) finishing table (500).

Further, the top (504, 512) and bottom (506, 510) plates of each of the one or more finishing tables (504, 512) may comprise an embossed or debossed pattern to allow calendering a texture into the extrudate. In general, the first finishing table 500 may have top and bottom plates (504, 506) which may be used to impress a pattern (embossed or debossed) on the extrudate, as the material may have a temperature sufficient to take such a pattern. Subsequent finishing tables may have cooled the extrudate to a degree insufficient to impress the pattern.

According to certain aspects of the apparatus, a first finishing table 500 may be positioned after the outlet end 16 of the die and may be moveable in a direction parallel to the longitudinal axis 100 of the die. When included, a second finishing table 502 may be positioned after the first finishing table 500 and moveable in a direction parallel to the longitudinal axis 100 of the die. The second finishing table 502 may be configured to (A) move away from the first finishing table 500 when the top plate 512 of the second finishing table 502 is in the down or clamped position and the top plate 504 of the first finishing table 500 is in any position, and move toward the first finishing table 500 when the top plate 512 of the second finishing table 502 is not in the clamped position and the top plate 504 of the first finishing table 500 is in the down or clamped position; (B) move in unison with the first finishing table 500; or (C) remain in a static position, wherein when the top plate 504 of the first finishing table 500 is in any position, the top plate 512 of the second finishing table 502 is in the down position to provide even cooling to the extrudate but no compression force on the extrudate.

More simply described, the one or more finishing tables may comprise a stationary lower plate and a vertically reciprocable upper plate operably mounted on a piston connected to a pneumatic cylinder (560A, 560B) which may be supported above the finishing table, such as by a support rail (580A, 580B). Vertical reciprocation of the piston within the pneumatic cylinder (560A, 560B) may be synchronized with the horizontally reciprocating stroke of the ram so that when the ram makes its inward stroke, (a) the upper plate is raised to the open position or is in a down position that does not restrict movement of the extrudate therein, or (b) the upper plate is clamped and the finishing table moves forward (away from the outlet end of the die). As the ram is withdrawn to the retracted position, the upper plate may move downwardly to the down or clamped position, and the finishing table may remain in place.

Each finishing table may be mounted on a rail, or may include wheels (300, 302) or any other means by which movement may occur that is not restricted by excess frictional forces.

As indicated above, the movement of the finishing table(s) may be coordinated with the movement of the ram. Further, the distance moved by each finishing table may also be coordinated with the movements of the ram. For example, each finishing table may be set to oscillate between limit switches set approximately 2" apart to coincide with a 2" stroke of the ram. When the table has pulled 2" of extrudate, for example, it may open the upper and lower plates (open or down position), move back to the front of the stroke, re-clamp the extrudate between the plates, and start pulling again.

In general, the finishing table(s) do not restrict movement of the extrudate away from the die, and may assist in movement of the extrudate away from the die. Further, the plates of the table(s) may be placed in a range of positions which include at least a down position that does not restrict movement of the extrudate but does provide even cooling of the extrudate.

To prevent the upper and lower plates (504, 506) of the first finishing table 500 from producing a frictional force opposing the extrusion direction, a second finishing table 502 may be used to apply tension to the extrudate and help overcome the frictional force created by the first finishing table 500. As such, the first finishing table 500 may be held stationary and the second finishing table 502 may oscillate to match movements of the ram as described above.

The first and second finishing tables, and any subsequent to that, may be connected by air cylinders 505 that provide the pull force. This may provide a means to connect and/or synchronize movement of the various finishing tables without needing a direct connection between the plates of the various finishing tables. In this way, heat will not conduct from the plates (504, 506) of the first finishing table 500 to the plates (510, 512) of the second finishing table 502, or any subsequent to that. This allows the second finishing table 502 to be cooled, such as with fans, without adversely affecting the first finishing table 500 which may remain hot. Moreover, the first finishing table 500 may be connected to the end of the die by an air cylinder (503) which may enable movement along the longitudinal axis.

Alternately, or in addition to the air cylinders (503, 505) that may connect the various finishing tables, each may be mounted on a rail system that may provide movement of the tables toward or away from the die. As mentioned above, such movement may be synchronized with the movements of the ram, and/or a prior finishing table.

As indicated above, various methods and devices are envisioned which may achieve even cooling and vertical compression forces on the extrudate, but do not exert horizontal backpressure on the extrudate. In general, the present invention is directed to devices and methods which may be used to hold the extrudate flat through compression perpendicular to the direction of flow through the die, and devices and methods which may cool the extrudate in a controlled fashion. Thus, the present invention may include any number of means which may move an extruded panel which has exited the die at a temperature above the melting point, or crystalline melt temperature, by alternating or consistently clamping it between upper and lower temperature controlled surfaces while the restraining device or clamp advances incrementally with the powder charge and the resulting emergence of the extrudate.

For example, rather than finishing tables, the extrudate may be pulled from the outlet end of the die using a tractor or belt, reciprocating puller, caterpillar puller, or the like. For example, a belt puller may be used which moves the extrudate away from the outlet end of the die between two belts. Directly adjacent each belt may be a plate such as, for example, an aluminum plate, that may be cooled, and thus may provide even cooling to the extrudate while also applying a compression force on the extrudate. More than one belt puller may be used to provide different cooling temperatures (e.g., step down in temperature) and/or pressures, and/or to allow certain of the belts to be embossed or debossed.

While specific devices have been disclosed which drive movement, such as the hydraulic cylinder 118 which moves the ram, the pneumatic cylinders (560A, 560B) which move the top plates on the finishing tables, and air cylinders (503, 505) which move the various finishing tables, any number and variety of devices which may provide movement are possible and within the scope of the presently disclosed invention. In addition, a more sophisticated method of triggering advancement of the one or more finishing tables, including controls through electronic encoder and proximity switches, timed to coincide with ram movements is possible and within the scope of the present invention.

An electrical panel may also be provided for the ram extrusion apparatus with appropriate switches, thermostats, temperature indicating dials, and such related instruments as are required to control operative conditions as to temperature, pressure, and the like, and provide visual indication thereof.

Example

An exemplary ram extrusion apparatus is described herein. While specific temperatures and dimensions are provided, these are given to describe an exemplary embodiment only and may vary within the bounds as defined and described hereinabove. Reference numbers are provided to assist an understanding of this specific embodiment, and may refer to any of FIGS. 1-7.

A die 10 comprising two highly polished steel die plates (72, 74), each three (3) inches thick, is sandwiched between two massive steel blocks (102, 104) which are each twenty four (24) inches thick. The die plates are separated by hardened spacers (76, thickness of panel; ≤¾ inches), and have a width of between 40 and 66 inches (width of panel; typically 54 inches), and a length of a little over 32 inches (length of die opening, not length of the panel) to form a rectangular die opening.

The entry end of the die has water coolers fitted into the machined slots in the die plates in order to prevent the powdered resin from oxidizing before it enters the die.

The die is heated by electric cartridge heaters fit into slots machined in the plates (72, 74). The heaters are arranged into twelve (12) individually controlled zones down the length of the die and eight (8) paired zones across the exit of the die. Additional heating zones across the exit face of the die (such as at 50C, see FIGS. 1D, 3 and 5) are provided so that different temperature profiles can be used across the width of the die at its exit: the outside edges of the die include additional heat input to prevent the plastic from sticking during an interruption or start-up and prevent charge lines (extrudate) from hanging back at edges of the panel.

An exemplary heating profile for an UHMW polyethylene resin may include three thermal zones along the longitudinal axis of the die opening: after the thermal break, 300° F. to 320° F.; Middle region, 330° F. to 420° F.; exit region, 300° F. to 350° F.

The entry end of the top block and die plate are machined to provide an aperture (resin inlet 32) for powdered UHMW polymer resin to be introduced into the die opening from a hopper 30 comprising a plurality of pipes (4; feed pipes 34) that extend down to the die entry. Each pipe can be raised or lowered in order to regulate the feed to the area beneath each pipe. Alternately, each feed tube may comprise an auger feeder, vibratory feeder, or rotary feeder. Aluminum shoes 80 are attached to the bottom of the pipes to help distribute the resin.

A steel plate (ram head 19) measuring half (0.5) an inch×fifty four (54) inches with a rectangular cross section is attached to a guided plate (ram 18) that is actuated by hydraulic cylinders (118). The ram is capable of a six (6) inch linear stroke that extends two (2) inches into the entry of the die. The ram is significantly thinner than the die opening to prevent rubbing and binding in the die. A wiper plate is used to push the ram against the bottom die surface to prevent the ram from lifting and to force the expelled air and fines up into the chamber opening. The back section of the ram is cooled with water channels to prevent oxidization of the resin.

Two finishing tables (500, 502) are provided after the outlet end of the die, wherein each finishing table comprises an upper and lower plate. The plates are generally aluminum with a thickness of ¾ inches (good thermal conductivity and sufficient stiffness). Pneumatic cylinders (560A, 560B) are used to apply pressure to the plates so that the plastic is held flat and also to ensure surface contact between plastic and aluminum to promote consistent thermal conductivity.

The tables are connected only by the two pneumatic cylinders 505 that provide the pull force so that heat will not conduct from the plates of the first finishing table to the plates of the second finishing table. The second finishing table may oscillate between limit switches set approximately 2" apart. When the table has pulled 2" of plastic, for example, it will open the aluminum plates, move back to the front of the stroke, re-clamp the panel, and start pulling again.

The first table section is heated in top and bottom plates which may have a partially or totally embossed or debossed texture to allow calendering a texture into the panel. The second table section advances simultaneously with the first and is connected mechanically to the first section, but consist of separate upper and lower plates. This second table is cooled, such as with fans, without adversely affecting the front table which remains hot.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:

1. An apparatus for extruding a polymer resin, the apparatus comprising:
   a die having an inlet end and an outlet end;
   a ram mounted for movement within the inlet end of the die from a retracted position to an extended position;
   at least one hopper configured to introduce the polymer resin in a granular state into a resin inlet of the die in a plurality of specifically metered amounts which vary across a width of the resin inlet end of the die, wherein the resin inlet is proximate the inlet end of the die and downstream of the retracted position of the ram, wherein the at least one hopper comprises a plurality of feed tubes spaced along the width of the resin inlet of the die, each of the plurality of feed tubes comprising a distal end proximal to the resin inlet of the die and a proximal end in fluid communication with the hopper, wherein each of the plurality of feed tubes is independently moveable in a vertical direction that is perpendicular to the longitudinal axis of the die to provide the plurality of specifically metered amounts of polymer resin which vary across the width of the resin inlet end of the die;
   a plurality of thermal zones in the die spaced along a width and a length of the die;
   means for heating certain of the plurality of thermal zones to a temperature above the crystalline melt temperature of the polymer resin; and
   means for imparting movement of the ram along a longitudinal axis of the die to move the polymer resin from the resin inlet through the plurality of thermal zones and out from the outlet end of the die as an extrudate, the polymer resin being melted and compressed to form an extrusion profile of the die during progression through the thermal zones of the die,
   wherein the polymer resin is extruded from the outlet end of the die at a temperature that is at or above the crystalline melt temperature of the polymer resin.

2. The apparatus of claim 1, wherein the plurality of feed tubes are evenly spaced along the width of the resin inlet of the die to provide a contiguous supply of the polymer resin along the width of the resin inlet of the die.

3. The apparatus of claim 1, wherein the die comprises a top portion, a bottom portion, and side portions which define the extrusion profile of the die, the extrusion profile having a thickness of not more than 0.75 inches and a width of between 40 inches and 66 inches.

4. The apparatus of claim 1, wherein the die further comprises an upper die plate and a lower die plate, each comprising a thermal break downstream of the resin inlet, wherein the thermal break defines at least a heated thermal region comprising the thermal zones spaced between the thermal break and the outlet end of the die.

5. The apparatus of claim 1, comprising:
   at least a first finishing table positioned after the outlet end of the die and moveable in a direction parallel to the longitudinal axis of the die, the first finishing table comprising top and bottom plates wherein the top plate is moveable in a direction perpendicular to the longitudinal axis of the die through a range of positions which include at least (a) an open position which does not contact the extrudate, (b) a down position which does contact the extrudate but does not apply a vertical compression force on the extrudate in a vertical direction perpendicular to the longitudinal axis of the die, and (c) a clamped position which applies the vertical compression force on the extrudate,
   wherein the first finishing table moves the extrudate away from the outlet end of the die so that there is no backpressure on the extrudate and promotes even cooling of the extrudate between the top and bottom plates when in the down position or the clamped position.

6. The apparatus of claim 5, further comprising:
   at least a second finishing table positioned after the first finishing table and moveable in the direction parallel to the longitudinal axis of the die, the second finishing table comprising top and bottom plates wherein the top plate is moveable in the direction perpendicular to the longitudinal axis of the die through a range of positions which include at least (a) an open position which does not contact the extrudate, (b) a down position which does contact the extrudate but does not apply a second vertical compression force on the extrudate in the vertical direction perpendicular to the longitudinal axis of the die, and (c) a clamped position which applies the second vertical compression force on the extrudate,
   wherein the second finishing table is configured to:
   (A) move away from the first finishing table when the top plate of the second finishing table is in the down or clamped position and the top plate of the first finishing table is in any position, and
   move toward the first finishing table when the top plate of the second finishing table is not in the clamped position and the top plate of the first finishing table is in the down or clamped position;
   (B) move in unison with the first finishing table; or
   (C) remain in a static position, wherein when the top plate of the first finishing table is in any position, the top plate of the second finishing table is in the down position to provide even cooling to the extruded resin but no second vertical compression force on the extrudate.

7. The apparatus of claim 6, wherein the first and second finishing tables include means for controlling a temperature of the top and bottoms plates to below the crystalline melt temperature of the polymer resin.

8. An apparatus for extruding a polymer resin, the apparatus comprising:
a die having an inlet end and an outlet end;
a ram mounted for movement within the inlet end of the die from a retracted position to an extended position;
at least one hopper configured to introduce the polymer resin in a granular state into a resin inlet of the die in a plurality of specifically metered amounts which vary across a width of the resin inlet end of the die, wherein the resin inlet is proximate the inlet end of the die and downstream of the retracted position of the ram, wherein the at least one hopper comprises a plurality of feed tubes spaced along the width of the resin inlet of the die, each of the plurality of feed tubes comprising a distal end proximal to the resin inlet of the die and a proximal end in fluid communication with the hopper, wherein each of the plurality of feed tubes comprise a shoe at the distal end thereof configured to distribute the polymer resin from each of the feed tubes to the resin inlet of the die;
a plurality of thermal zones in the die spaced along a width and a length of the die;
means for heating certain of the plurality of thermal zones to a temperature above the crystalline melt temperature of the polymer resin; and
means for imparting movement of the ram along a longitudinal axis of the die to move the polymer resin from the resin inlet through the plurality of thermal zones and out from the outlet end of the die as an extrudate, the polymer resin being melted and compressed to form an extrusion profile of the die during progression through the thermal zones of the die,
wherein the polymer resin is extruded from the outlet end of the die at a temperature that is at or above the crystalline melt temperature of the polymer resin.

9. The apparatus of claim 8, wherein each of the plurality of feed tubes comprise an auger feeder, a vibratory feeder, or a rotary feeder which is independently controllable to provide the plurality of specifically metered amounts of polymer resin which vary across the width of the resin inlet end of the die.

10. An apparatus for extruding a polymer resin, the apparatus comprising:
a die having an inlet end and an outlet end;
a ram mounted for movement within the inlet end of the die from a retracted position to an extended position;
at least one hopper for introducing the polymer resin in a granular state into a resin inlet, wherein the resin inlet is proximate the inlet end of the die and downstream of the retracted position of the ram;
a plurality of thermal zones in the die spaced along a width and a length of the die;
means for heating certain of the plurality of thermal zones to a temperature above the crystalline melt temperature of the polymer resin;
means for imparting movement of the ram along a longitudinal axis of the die to move the polymer resin from the resin inlet through the plurality of thermal zones and out from the outlet end of the die as an extrudate, the polymer resin being melted and compressed to form an extrusion profile of the die during progression through the plurality of thermal zones of the die, wherein the resin is extruded from the outlet end of the die as an extrudate at a temperature that is at or above the crystalline melt temperature of the polymer resin;
means for moving the extrudate away from the outlet end of the die which does not apply a compressive force on the extrudate parallel to the longitudinal axis of the die; and
means for evenly cooling and compressing the extrudate after exit from the outlet end of the die.

11. The apparatus of claim 10, wherein the means for moving the extrudate away from the outlet end of the die applies a vertical compression force on the extrudate perpendicular to the longitudinal axis of the die.

12. The apparatus of claim 10, wherein the means for moving the extrudate away from the outlet of the die and for evenly cooling and compressing the extrudate comprises:
at least a first finishing table positioned after the outlet end of the die and moveable in a direction parallel to the longitudinal axis of the die, the first finishing table comprising top and bottom plates wherein the top plate is moveable in a direction perpendicular to the longitudinal axis of the die through a range of positions which include at least (a) an open position which does not contact the extrudate, (b) a down position which does contact the extrudate but does not apply a vertical compression force on the extrudate in a vertical direction perpendicular to the longitudinal axis of the die, and (c) a clamped position which applies the vertical compression force on the extrudate,
wherein the first finishing table moves the extrudate away from the outlet end of the die so that there is no backpressure on the extrudate and promotes even cooling of the extrudate between the top and bottom plates when in the down position or the clamped position.

13. The apparatus of claim 12, further comprising:
at least a second finishing table positioned after the first finishing table and moveable in the direction parallel to the longitudinal axis of the die, the second finishing table comprising top and bottom plates wherein the top plate is moveable in the direction perpendicular to the longitudinal axis of the die through a range of positions which include at least (a) an open position which does not contact the extrudate, (b) a down position which does contact the extrudate but does not apply a second vertical compression force on the extrudate in the vertical direction perpendicular to the longitudinal axis of the die, and (c) a clamped position which applies the second vertical compression force on the extrudate,
wherein the second finishing table is configured to:
(A) move away from the first finishing table when the top plate of the second finishing table is in the down or clamped position and the top plate of the first finishing table is in any position, and
move toward the first finishing table when the top plate of the second finishing table is not in the clamped position and the top plate of the first finishing table is in the down or clamped position;
(B) move in unison with the first finishing table; or
(C) remain in a static position, wherein when the top plate of the first finishing table is in any of the range of positions, the top plate of the second finishing table is in the down position to provide even cooling to the extrudate but no second vertical compression force on the extrudate.

14. The apparatus of claim 10, wherein the die further comprises an upper die plate and a lower die plate, each comprising a thermal break downstream of the resin inlet, wherein the thermal break defines at least a heated thermal region comprising the thermal zones spaced between the thermal break and the outlet end of the die.

15. The apparatus of claim 12, wherein the first finishing table includes means for controlling a temperature of the top and bottom plates to below the crystalline melt temperature of the polymer resin.

16. The apparatus of claim 13, wherein the first and second finishing tables includes means for controlling a temperature of the top and bottom plates to below the crystalline melt temperature of the polymer resin.

17. The apparatus of claim 10, wherein the at least one hopper is configured to introduce the polymer resin into the resin inlet of the die in a plurality of specifically metered amounts which vary across a width of the resin inlet end of the die.

18. The apparatus of claim 17, wherein the at least one hopper comprises:
a plurality of feed tubes spaced along a width of the resin inlet of the die, each of the plurality of feed tubes comprising a distal end which is proximal to the resin inlet of the die and a proximal end in fluid communication with a bottom portion of the hopper.

19. The apparatus of claim 18, wherein each of the plurality of feed tubes comprise a shoe at the distal end thereof configured to distribute the polymer resin from each of the feed tubes to the resin inlet of the die.

20. The apparatus of claim 18, wherein each of the plurality of feed tubes comprise an auger feeder, a vibratory feeder, or a rotary feeder which is independently controllable to provide the plurality of specifically metered amounts of polymer resin which vary across a width of the resin inlet end of the die.

21. The apparatus of claim 18, wherein each of the plurality of feed tubes is independently moveable in a vertical direction that is perpendicular to the longitudinal axis of the die to provide the plurality of specifically metered amounts of polymer resin which vary across a width of the resin inlet end of the die.

22. The apparatus of claim 10, wherein the die comprises a top portion, a bottom portion, and side portions which define the extrusion profile of the die, the extrusion profile having a thickness of not more than 0.75 inches and a width of between 40 inches and 66 inches.

* * * * *